Feb. 4, 1969   E. H. CARNEVALE ET AL   3,425,064
TRANSDUCER FOR ARTIFICIAL HEART
Filed May 9, 1966

INVENTORS
EDMUND H. CARNEVALE
LAWRENCE C. LYNNWORTH
RONALD N. LAWSON
BY
Weingarten, Ozenbuch & Lalive
ATTORNEYS

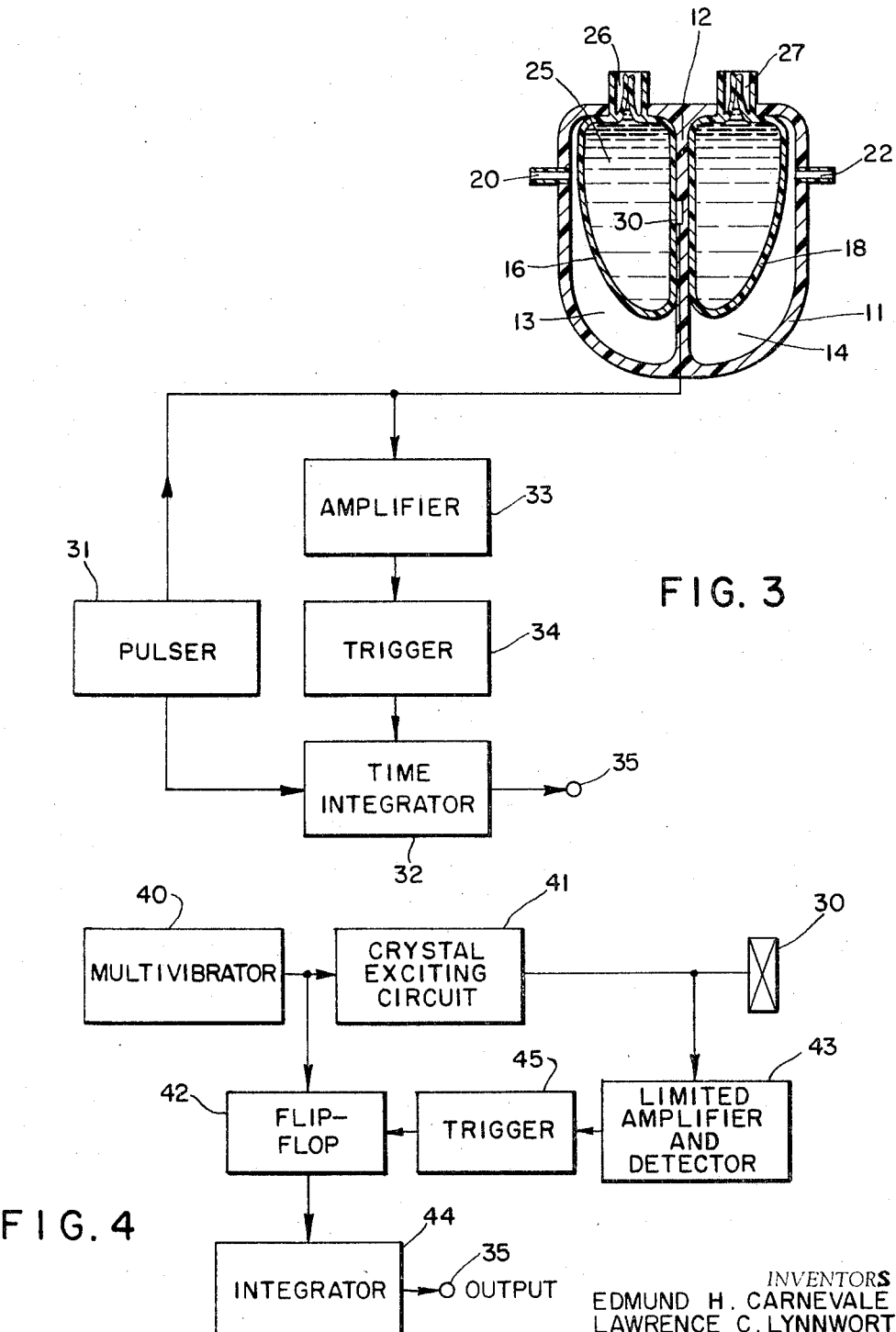

United States Patent Office 3,425,064
Patented Feb. 4, 1969

3,425,064
TRANSDUCER FOR ARTIFICIAL HEART
Edmund H. Carnevale, Beverly, and Lawrence C. Lynnworth and Ronald N. Lawson, Waltham, Mass., assignors to Parametrics, Inc., Waltham, Mass., a corporation of Massachusetts
Filed May 9, 1966, Ser. No. 548,695
U.S. Cl. 3—1     6 Claims
Int. Cl. A61f *1/00;* A61b *5/00;* G01n *9/24*

ABSTRACT OF THE DISCLOSURE

A transducer for measuring the cardiac output of an artificial heart by mounting an ultrasonic transducer on a rigid portion of the heart and measuring the times required for pulses of ultrasonic energy to travel from that portion to the flexible portion of the heart and return, thereby indicating the average displacement of the flexible portion of the heart from the rigid portion.

---

This invention relates in general to artificial hearts and more particularly to a transducer for providing an output signal indicative of ventricular displacement within an artificial heart.

Recent medical research has produced a number of designs for artificial hearts. These devices are intended for use both as an auxiliary or temporary replacement for the natural heart during surgery or other critical periods and also as a permanent replacement for a diseased natural heart. The paramount measure of performance of a heart, both natural and artificial, is the cardiac output. This is defined as the volume of blood pumped per minute by the heart. A transducer which measures this volumetric rate provides, therefore, an evaluation of the performance of an artificial heart. The heart is, of course, but one element of a total circulatory system and, as such, it must be responsive to variations within that system and also must operate in a way which is compatible with the remainder of that system.

One of the required characteristics of natural and hence also of artificial hearts is that the outputs from the left and right ventricles are in balance. Otherwise there is an excessive accumulation of blood in the blood vessels either in the lungs or in the remainder of the body. In the natural heart this balance is provided by the principle known as "Starling's Law." According to this principle, the amount of blood pumped at each beat depends upon the amount of stretching of the chamber muscles, which in turn is dependent upon the amount of venous blood which fills the chamber. In an artificial heart this balance must be achieved artificially and this is generally accomplished by means of a servo mechanical control loop in which a transducer provides a signal indicative of the chamber blood volume, which signal is in turn converted to a control signal affecting the pattern and rate of pumping. In order to be effective, the transducer must provide, at frequent intervals, signals indicative of the volume of blood being pumped on each stroke. It has been found that the arterial blood pressure as an indicator of cardiac output provides an unreliable signal for affecting the pattern and rate of pumping. What is required is a transducer which can reliably provide this information at relatively high speeds and yet which does not interfere with the functioning of the artificial heart and is compatible in terms of size and power requirements.

It is therefore a primary object of this invention to provide an efficient transducer providing a useful signal indicative of the cardiac output of an artificial heart.

Broadly speaking, the transducer of this invention utilizes ultrasonic measurement of ventricular displacement as an indicator of the cardiac output. Typical artificial heart designs, such as those described in Scientific American, November 1965, utilize a flexible ventricle wall with the pumping action achieved by compressing this flexible ventricular wall to force the blood out into the artery. The displacement and velocity of this ventricular wall is directly related to the volume of blood pumped per minute. The ultrasonic measurement is made by positioning a suitable ultrasonic transducer such as a piezoelectric crystal on a fixed wall of the ventricle, pulsing this transducer and measuring the transit time of the ultrasonic pulse across the gap from the fixed wall to the flexible wall and back. In this system variations in transit time represent variations in the position of the ventricular wall and, provided that sufficient measurements are made per unit time, this output can be used as a direct representation of the cardiac output. An output may be derived electrically which is proportional to ventricular wall velocity.

Other objects and advantages will become apparent from the following detailed description when taken in conjunction with the accompanying drawing in which:

FIG. 3 is an illustration in block diagrammatic form of a second embodiment of a transducer system utilizing the principles of this invention; and FIG. 4 is an illustration in schematic form of circuitry suitable for use in the transducer systems illustrated either in FIG. 2 or FIG. 3.

Figure 1:
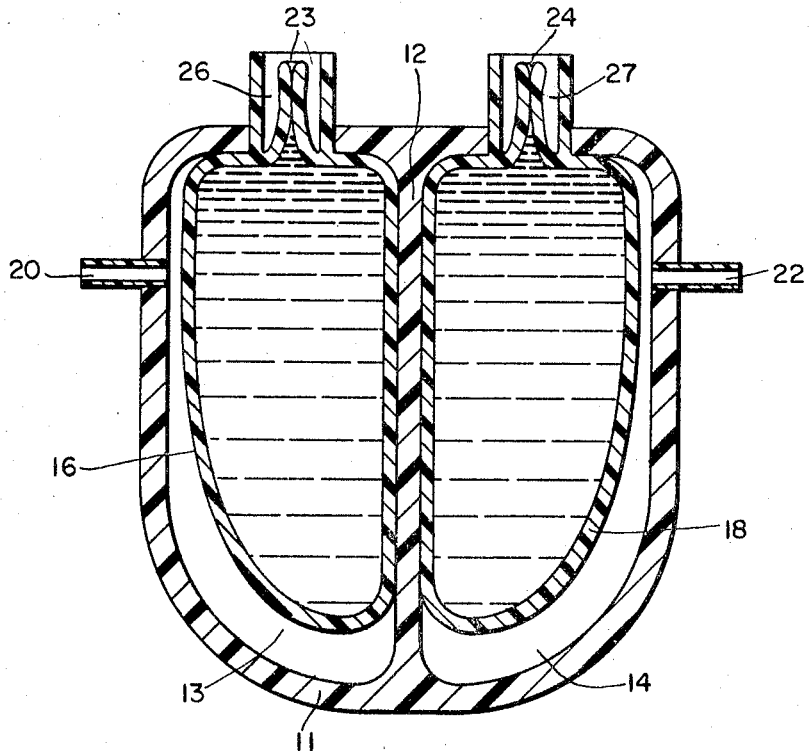
FIG. 1 is a diagrammatic representation of an artificial heart suitable for use with the transducer of this invention.

With reference now specifically to FIG. 1 an artificial heart of the type which uses air pressure to compress a flexible ventricular wall is shown. The entire body of the artificial heart is constructed of a silicone rubber material such as the material Silastic produced by Dow Corning Corp. This material has been found to be suitable in terms of inertness and acceptability by the body tissues and provides an appropriate surface for passage of blood without leading to clotting problems and the like. The heart structure includes a relatively rigid external wall 11 forming a receptacle which is divided into two chambers by a septum 12. The left-hand chamber forms the left ventrical 13 while the right-hand chamber forms the right ventricle 14. In addition to the rigid external wall 11, each of the ventricles includes a flexible portion with the left ventricle flexible portion being designated 16 and the flexible portion of the right ventricle being designated 18. Within the portion of the left ventricle which is enclosed by the flexible wall is opening 23 containing valve 26 for providing blood flow to the aorta on systole. A similar opening 24 in the right ventricle contains valve 27 and provides blood flow to the pulmonary artery during systole. Similarly, each ventricle includes an opening with appropriate valving to allow venous blood to enter from the vena cava or pulmonary vein. While some artificial hearts include auricular chambers, it has been found that not all artificial hearts need to include these chambers and in the present designs which do include them the chambers are passive elements and hence are not shown on this diagram. Each of the ventricles 13 and 14 also include air intake openings shown generally at 20 and 22 for allowing air to enter within the space between the flexible ventricular wall and the rigid wall 11.

In operation, the pumping action of this artificial heart is achieved by passing air under pressure into the space between the flexible ventricular wall and the rigid outer wall thereby compressing the ventricle and forcing the blood out through the arterial valve during systole. Relieving the air pressure allows the pressure from the venous blood return to fill the flexible ventricular sac during diastole.

Figure 2:
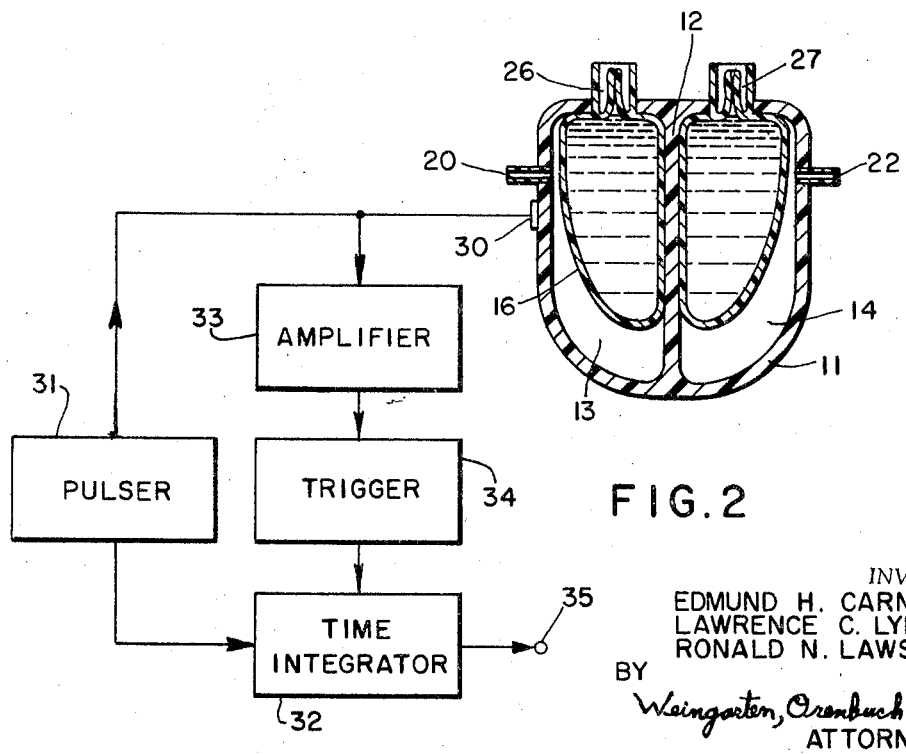
FIG. 2 is an illustration in block diagrammatic form of one embodiment of a transducer system utilizing the principles of this invention.

In this artificial heart design the position of the flexible ventricular wall with respect either to the septum 12 or the fixed outer wall 11 is indicative of the amount of blood within the ventricle at that particular instant. The variations of this ventricular wall position as a function of time are therefore an indication of the volume of blood passing through the ventricle. Referring now to FIG. 2, there is shown in block diagrammatic form an ultrasonic transducer positioned to measure the ventricular displacement. An ultrasonic piezoelectric crystal 30 is mounted on the fixed portion 11 of the artificial heart wall adjacent to the left ventricle 13. This crystal must be able to operate for indefinite periods of time without any degradation of its characteristics. For this purpose any of several piezoelectric materials may be used, such as quartz or lead-zirconate-titanate. Alternatively, a magnetostrictive ultrasonic transducer such as a nickel or nickel alloy wafer may be used. These crystals may be energized at low voltage and with low power levels, typically less than 1 watt. A suitable size for such crystals is a wafer ¼ inch in diameter and between .01 and .1 inch thick. A pulser 31 is connected both to the piezoelectric crystal 30 and to a time integrator circuit 32. The pulser provides at a suitable repetition rate, such as ten times per second, square output pulses of short duration which excite the piezoelectric crystal causing it to transmit an ultrasonic pulse across the ventricle 13. This pulser 31 also sends a signal to the time integrator 32 to initiate the time integration period simultaneously with the excitation of the piezoelectric crystal 30. An amplifier 33 has its input electrically coupled to the piezoelectric crystal 30 and provides its output to a trigger circuit 34 which is in turn connected to the time integrator 32.

The operation of the device is as follows. The pulser 31 provides an output pulse of approximately 1 microsecond duration ten times per second. For each pulse the crystal 30 is excited and generates a pulse of ultrasonic energy across the ventricular chamber 13 at a frequency in the order of a megacycle. Simultaneously with the initiation of this ultrasonic pulse from the crystal 30 the signal from the pulser 31 initiates the time integrator circuit 32. The ultrasonic pulse travels across the ventricular chamber 13 and, upon striking the flexible wall portion 16, it is reflected back to the crystal 30. The reflected ultrasonic energy excites the crystal 30 providing an output electrical signal to the input of amplifier 33. The signal is amplified by amplifier 33 and the output from this amplifier is shaped in trigger circuit 34 into a triggering pulse which, applied to time integrator 32, turns off this latter unit. Time integrator 32 may be any suitable circuit providing an output signal on output terminal 35 directly proportional to the elapsed time between the arrival of a signal from the pulser 31 and the subsequent arrival of a signal from the trigger circuit 34. This elapsed time is equal to the sum of the electrical delays in the system plus the transit time of the ultrasonic pulse from the crystal 30 to the flexible wall 16 and back. As the acoustic wave velocity is essentially a constant in either blood or air, this elapsed time is proportional to wall displacement. Since the electrical delays are substantially constant, this relationship yields a direct indication of the volume of blood within the ventricle at the time of the pulse.

With the crystal 30 in the position illustrated in FIG. 2, the pulse of ultrasonic energy is propagated through air until it strikes the flexible portion of the ventricular wall and it is then reflected back through air. The gap between the crystal and flexible portion of the ventricular wall, will of course, vary as the heart pumps, however, the maximum distance of this air gap is approximately one inch. The ultrasonic pulse will travel back and forth through one inch of air in approximately 160 microseconds and, accordingly, a response time of this system of less than one millisecond is readily achieveable.

Referring now to FIG. 3, an alternative embodiment of the transducer system is shown. In FIG. 3, like numbers refer to like parts of the artificial heart shown in FIG. 2. The crystal 30 in the configuration of FIG. 3 is mounted within the septum 12. The pulse of ultrasonic energy is then directed through the enclosed portion of the ventricle 13 to reflect from the inner surface of wall 16. The operation of the remaining part of the system remains the same as for the configuration shown in FIG. 2. In this instance, however, the ultrasonic pulse is being transmitted through blood rather than air and hence the maximum transit time is in the order of 30 microseconds.

In FIGS. 2 and 3 the circuitry has been shown in block diagrammatic form. While a number of different circuits are suitable for the individual blocks shown in these figures, a somewhat more detailed block diagram for this circuitry is shown in FIG. 4.

Referring now to FIG. 4, a multivibrator 40 provides output signals at a fixed frequency to both crystal exciting circuit 41 and flip-flop 42. The crystal exciting circuit 41 includes a silicon controlled rectifier which is used to switch a charged capacitor directly across the crystal 30 thereby exciting it. The flip-flop unit 42 is a conventional bistable unit which, when in one state (conducting), provides a direct current output to integrator 44 and, when in the other state (non-conducting), provides essentially a zero output to integrator 44. The triggering pulse from multivibrator 40 is coupled through a pulse stretching circuit to flip-flop 42. This pulse drives the flip-flop into its "on" condition, that is, the state where it provides a direct current output to integrator 44. When the ultrasonic pulse transmitted from crystal 30 is reflected and returned to it, the crystal provides an output signal to limited amplifier and detector 43. This output is coupled through a trigger circuit 45 to another input to flip-flop 42. The pulse on this trigger input from limited amplifier 43 to flip-flop 42 turns off the flip-flop thereby terminating the direct current signal to integrator 44. The limited amplifier 43 is an amplifier which is amplitude limited such that the initial pulse received at its input from crystal exciting circuit 41 generates an amplifier output signal of substantially the same amplitude as that produced by the signal generated at crystal 30 in response to the reflected ultrasonic energy. The pulse stretching circuit at the input to flip-flop 42 from multivibrator 40 assures that this flip-flop remains turned on until after the initial exciting pulse from the exciting circuit 41 has ended.

The time integrator 44 provides at output terminal 35 a direct current signal proportional to the average time that the flip-flop is in its "on" condition. This signal then is proportional to the elapsed time between the emission of the ultrasonic pulse from the crystal 30 and the time at which the reflected energy is returned to this crystal 30, and is therefore a measure of the distance between crystal 30 and the ventricle wall 16.

While the transducer system has been described above generally in terms of a single crystal in the artificial heart, the system may employ transducers for each ventricle. Typically, in a multiple transducer arrangement, the frequency of one of the ultrasonic transducers might be selected as one megacycle and the frequency of the other at two megacycles to prevent ambiguity as to the origin of the ultrasonic energy.

Having described the invention, modifications and improvements may occur to those skilled in the art; hence the invention described herein should be construed as limited only by the spirit and scope of the appended claims.

What is claimed is:

1. In an artificial heart in which a portion of the ventricular wall is relatively rigid and a portion of the ventricular wall is relatively flexible, the improvement comprising, an ultrasonic transducer mounted on said relatively rigid portion of said ventricular wall and positioned to transmit a pulse of ultrasonic energy across at least a portion of said ventricular chamber in the direction of said flexible portion of said ventricular wall;

first circuit means for repetitively exciting said ultrasonic transducer to transmit pulses of ultrasonic energy into said chamber at predetermined intervals;

second circuit means coupled to said transducer for measuring the time required for each pulse of ultrasonic energy transmitted from said transducer to be reflected from said flexible portion of said ventricular wall and returned to said transducer; and output means for generating an output signal indicating the amount of time measured by said second circuit means.

2. Apparatus in accordance with claim 1 wherein said ultrasonic transducer is formed of a piezoelectric crystal.

3. Apparatus in accordance with claim 1 wherein said ultrasonic transducer is formed of a magnetostrictive material.

4. Apparatus in accordance with claim 1 wherein said transducer is mounted in the relatively rigid portion of said ventricle forming the septum of said artificial heart.

5. Apparatus in accordance with claim 2 wherein said first circuit means comprises a time base circuit providing output signals at a fixed repetition rate and a means controlled by said time based circuit for applying an exciting voltage across said piezoelectric crystal.

6. Apparatus in accordance with claim 5 and wherein said second circuit means comprises a bistable element having first and second inputs, signals on said first input driving said bistable element into a first state and signals on said second input driving said bistable element into a second state, means connecting the output of said time base circuit to said first input of said bistable means, said piezoelectric crystal being electrically coupled to said second input of said bistable means.

References Cited

UNITED STATES PATENTS

| 3,182,335 | 5/1965 | Bolie | 3—1 |
| 3,238,767 | 3/1966 | Clynes | 73—67.9 |
| 3,310,049 | 3/1967 | Clynes | 128—2.05 |

OTHER REFERENCES

"An Artificial Heart Inside the Body" by William J. Kolff, in Scientific American, November 1965, vol. 213, No. 5, pp. 38–46.

Heart Research News, U.S. Dept. of Health, Education, and Welfare, Public Health Service, September 1964, pp. 25–27.

Artificial Heart (description with photograph) from National Health Institute, U.S. Dept. of HEW, Public Health Service. Received in Group 335 January 1965.

RICHARD A. GAUDET, *Primary Examiner.*

RONALD L. FRINKS, *Assistant Examiner.*

U.S. Cl. X.R.

73—67.8; 128—2.05